United States Patent

Ferguson et al.

(10) Patent No.: US 8,904,273 B2
(45) Date of Patent: Dec. 2, 2014

(54) SYSTEM AND METHOD OF FORMAT SPECIFICATION

(75) Inventors: Kevin M. Ferguson, Manotick (CA); Xu Wu, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 447 days.

(21) Appl. No.: 10/884,805

(22) Filed: Jul. 2, 2004

(65) Prior Publication Data

US 2006/0005127 A1    Jan. 5, 2006

(51) Int. Cl.
*G06F 17/27* (2006.01)
*G06F 17/21* (2006.01)
*G06F 17/30* (2006.01)
*G06F 17/22* (2006.01)

(52) U.S. Cl.
CPC ........ *G06F 17/218* (2013.01); *G06F 17/30557* (2013.01)
USPC ........... 715/221; 715/202; 715/204; 715/251; 715/258

(58) Field of Classification Search
CPC .......... G06F 17/218; G06F 17/30557
USPC ......... 715/503, 504, 522, 908, 202, 204, 258, 715/251, 221
See application file for complete search history.

(56) References Cited

U.S. PATENT DOCUMENTS

| | | | |
|---|---|---|---|
| 5,301,109 A | 4/1994 | Landauer et al. | |
| 5,530,861 A | 6/1996 | Diamant et al. | |
| 5,551,055 A | 8/1996 | Matheny et al. | |
| 5,579,444 A | 11/1996 | Dalziel et al. | |
| 5,652,884 A | 7/1997 | Palevich | |
| 5,687,366 A | 11/1997 | Harvey, III et al. | |
| 5,758,355 A | 5/1998 | Buchanan | |
| 5,767,854 A * | 6/1998 | Anwar .......................... | 715/848 |
| 5,787,452 A | 7/1998 | McKenna | |
| 5,794,246 A | 8/1998 | Sankaran et al. | |
| 5,802,352 A | 9/1998 | Chow et al. | |
| 5,870,746 A | 2/1999 | Knutson et al. | |
| 5,873,111 A | 2/1999 | Edberg | |
| 5,907,326 A | 5/1999 | Atkin et al. | |
| 5,917,484 A | 6/1999 | Mullaney | |
| 5,937,155 A | 8/1999 | Kennedy et al. | |
| 6,018,742 A | 1/2000 | Herbert, III | |
| 6,067,548 A | 5/2000 | Cheng | |

(Continued)

FOREIGN PATENT DOCUMENTS

| | | |
|---|---|---|
| CA | 2 410 277 A1 | 11/2001 |
| CA | 2361176 | 5/2003 |
| WO | 00/42553 | 7/2000 |

OTHER PUBLICATIONS

Bott, Ed, "Using Microsoft Office 2000," Que Corporation, 1999, 34 pages.

(Continued)

*Primary Examiner* — Kyle R Stork
*Assistant Examiner* — Wilson Tsui
(74) *Attorney, Agent, or Firm* — Shumaker & Sieffert, P.A.

(57) ABSTRACT

A value formatting system for determining format specifications in reports is provided. The value formatting system comprises a format collection unit for collecting data value attributes and patterns for a data item in a report, and a format merging unit for merging the collected data value attributes and patterns into a format specification for the data item.

12 Claims, 7 Drawing Sheets

(56) References Cited

U.S. PATENT DOCUMENTS

| | | | |
|---|---|---|---|
| 6,160,549 A * | 12/2000 | Touma et al. | 715/762 |
| 6,195,653 B1 | 2/2001 | Bleizeffer et al. | |
| 6,260,050 B1 | 7/2001 | Yost et al. | |
| 6,341,286 B1 | 1/2002 | Kawano | |
| 6,349,275 B1 | 2/2002 | Schumacher et al. | |
| 6,430,584 B1 | 8/2002 | Comer et al. | |
| 6,457,008 B1 | 9/2002 | Rhee et al. | |
| 6,460,031 B1 | 10/2002 | Wilson, III et al. | |
| 6,469,713 B2 | 10/2002 | Hetherington et al. | |
| 6,487,546 B1 | 11/2002 | Witkowski | |
| 6,496,793 B1 | 12/2002 | Veditz et al. | |
| 6,542,515 B1 | 4/2003 | Kumar et al. | |
| 6,567,814 B1 | 5/2003 | Bankier et al. | |
| 6,581,068 B1 | 6/2003 | Bensoussan et al. | |
| 6,697,999 B1 * | 2/2004 | Breuer et al. | 715/517 |
| 6,718,336 B1 * | 4/2004 | Saffer et al. | 1/1 |
| 6,738,975 B1 * | 5/2004 | Yee et al. | 719/310 |
| 6,768,994 B1 * | 7/2004 | Howard et al. | 707/10 |
| 6,785,689 B1 * | 8/2004 | Daniel et al. | 707/102 |
| 6,845,367 B2 | 1/2005 | Bendel et al. | |
| 6,871,319 B2 * | 3/2005 | Taboada et al. | 715/509 |
| 6,882,353 B2 | 4/2005 | Nettles et al. | |
| 6,892,348 B1 * | 5/2005 | Truelove et al. | 715/513 |
| 6,980,963 B1 | 12/2005 | Hanzek | |
| 7,000,182 B1 * | 2/2006 | Iremonger et al. | 715/235 |
| 7,015,911 B2 * | 3/2006 | Shaughnessy et al. | 345/440 |
| 7,139,686 B1 | 11/2006 | Critz et al. | |
| 7,140,001 B1 | 11/2006 | Natori et al. | |
| 7,177,859 B2 | 2/2007 | Pather et al. | |
| 7,207,005 B2 | 4/2007 | Lakritz | |
| 7,213,202 B1 | 5/2007 | Kagle | |
| 7,228,353 B1 | 6/2007 | Franceschelli, Jr. et al. | |
| 7,240,073 B2 * | 7/2007 | Benson et al. | 707/103 R |
| 7,356,758 B1 | 4/2008 | Bedell et al. | |
| 7,426,520 B2 * | 9/2008 | Gorelik et al. | 1/1 |
| 2001/0011287 A1 * | 8/2001 | Goto et al. | 707/513 |
| 2002/0069230 A1 | 6/2002 | Schubert, Jr. et al. | |
| 2002/0073080 A1 | 6/2002 | Lipkin | |
| 2002/0099743 A1 | 7/2002 | Workman et al. | |
| 2002/0143831 A1 | 10/2002 | Bennett | |
| 2002/0174000 A1 | 11/2002 | Katz et al. | |
| 2002/0174196 A1 | 11/2002 | Donohoe et al. | |
| 2002/0175937 A1 | 11/2002 | Blakely et al. | |
| 2002/0184308 A1 | 12/2002 | Levy et al. | |
| 2002/0188896 A1 | 12/2002 | Filteau et al. | |
| 2003/0046527 A1 | 3/2003 | Musuchenborn | |
| 2003/0084053 A1 | 5/2003 | Govrin et al. | |
| 2003/0088447 A1 | 5/2003 | Desbiens et al. | |
| 2003/0088540 A1 | 5/2003 | Edmunds et al. | |
| 2003/0088565 A1 | 5/2003 | Walter et al. | |
| 2003/0140316 A1 | 7/2003 | Lakritz | |
| 2003/0144922 A1 | 7/2003 | Schrantz | |
| 2003/0172168 A1 * | 9/2003 | Mak et al. | 709/230 |
| 2003/0217063 A1 | 11/2003 | Tomic et al. | |
| 2004/0002972 A1 | 1/2004 | Pather et al. | |
| 2004/0030781 A1 | 2/2004 | Etesse et al. | |
| 2004/0060001 A1 * | 3/2004 | Coffen et al. | 715/503 |
| 2004/0088650 A1 | 5/2004 | Killen et al. | |
| 2004/0139102 A1 | 7/2004 | Vierich et al. | |
| 2004/0139426 A1 | 7/2004 | Wu | |
| 2004/0221233 A1 | 11/2004 | Thielen | |
| 2004/0236738 A1 | 11/2004 | Thier et al. | |
| 2004/0243593 A1 | 12/2004 | Stolte et al. | |
| 2005/0010550 A1 | 1/2005 | Potter et al. | |
| 2005/0033600 A1 | 2/2005 | Geddes et al. | |
| 2005/0131924 A1 | 6/2005 | Jones | |
| 2005/0177532 A1 | 8/2005 | Desbiens | |
| 2005/0198042 A1 | 9/2005 | Davis | |
| 2005/0228815 A1 | 10/2005 | Carus et al. | |
| 2006/0004745 A1 | 1/2006 | Kuhn et al. | |
| 2006/0080082 A1 | 4/2006 | Ravindra et al. | |
| 2006/0200448 A1 | 9/2006 | Edmunds et al. | |
| 2006/0259509 A1 | 11/2006 | Stolte et al. | |
| 2007/0130503 A1 | 6/2007 | Voshell | |
| 2007/0150241 A1 | 6/2007 | Critz et al. | |
| 2007/0225966 A1 | 9/2007 | Suen et al. | |

OTHER PUBLICATIONS

Buchner et al., "An Internationalised Object Data Mode: A Locale-Based Approach", Proc. 9$^{th}$ Intl. Conference on Data Management of Data(COMAD98), Hyderbad, India 1998, (16 pages).

Jackson, "Global Businesses can Use Local Languages with OS/2 Warp Server for e-business", IBM Network Computing Software, Apr. 1999, (7 pages).

Ronen et al., "Spreadsheet Analysis and Design", ACM, vol. 31, No. 1, 1989, (pp. 84-93).

Ballou et al., "Implication of Data Quality for Spreadsheet Analysis", Data Base, 1987, (pp. 13-19).

Augusto Celentano et al., "Schema Modelling for Automatic Generation of Multimedia Presentations," ACM 2002, pp. 593-600.

Robin Abraham et al., "Inferring Templates from Spreadsheets," 2006 ACM, pp. 182-191.

Canadian Office Action from related Canadian Application No. 2,472,940 mailed Jan. 28, 2009 (2 pages).

Prague et al., "Microsoft Access 97 Bible Gold Edition", IDG Books Worldwide Inc. 1999, pp. 400-404, 924-929.

* cited by examiner

# SYSTEM AND METHOD OF FORMAT SPECIFICATION

FIELD OF THE INVENTION

The invention relates generally to reporting tools, and in particular to a system and method of merging format specifications.

BACKGROUND OF THE INVENTION

Reporting of business intelligence (BI) is the process of accessing, formatting, and delivering stored, collected and processed data. Reporting helps users understand the performance of a business and leads to immediate action on the most recent information. It creates a common context for decision-making.

Reporting provides high-performance engines to merge predefined report templates with large volumes of data to produce, publish and distribute reports to a wide audience of information consumers. Key reporting features for reporting include advanced formatting, multi-pass calculations, bursting, table of contents navigation, on-demand paging, report element security and output to multiple formats (for example, portable document format (PDF), hypertext markup language (HTML), and spreadsheet applications).

When a report is generated, it is common to retrieve the data from different databases, aggregate them and display the data in a report. It is also common to set a format style to the data to be presented in a report. For example, a cell in a spreadsheet may be specified to a particular format, such as string, number, etc. A user may modify format settings of a cell individually or in a grouping such as a column or row. However, modifying the format of a footer or header of a page does not modify cells. Similarly, modifying the data format of one or more cells does not modify a header or footer of a page or display of a report.

Therefore, there is a need for an improved system and method of format specification in a report.

SUMMARY OF THE INVENTION

It is an object of the present invention to provide a system and method of merging format specifications.

In accordance with an embodiment of the present invention, there is provided a value formatting system for determining format specifications in reports. The value formatting system comprises a format collection unit for collecting data value attributes and patterns for a data item in a report, and a format merging unit for merging the collected data value attributes and patterns into a format specification for the data item.

In accordance with another embodiment of the present invention, there is provided a value formatting system for determining format specifications in reports. The value formatting system comprises a conditional formatting resolution unit for processing conditional formatting styles set in a reporting application, a format merging unit for merging format specifications, an inherited format classification unit for classifying inherited format specifications, a defined format classification unit for classifying defined format specifications, a defined format selection unit for selecting a defined format specification from the classified defined format specifications, a format association unit for associating the selected defined format specification to a corresponding inherited format specification, and a format association unit for applying the associated format specification to the data item value.

In accordance with another embodiment of the present invention, there is provided a method of formatting data item values in reports. The method comprises the steps of collecting data value attributes and patterns for a data item in a report, and merging the collected data value attributes and patterns into a format specification for the data item.

In accordance with another embodiment of the present invention, there is provided a method of formatting data item values in reports. The method comprises the steps of processing conditional formatting styles set in a reporting application, merging format specifications in the reporting application, classifying inherited format specifications in the reporting application, classifying defined format specifications in the reporting application, selecting a defined format specification from the classified defined format specifications, associating the selected defined format specification to a corresponding inherited format specification, and applying the associated format specification to the data item value.

In accordance with another embodiment of the present invention, there is provided a computer data signal embodied in a carrier wave and representing sequences of instructions which, when executed by a processor, cause the processor to perform a method of formatting data item values in reports. The method comprises the steps of collecting data value attributes and patterns for a data item in a report, and merging the collected data value attributes and patterns into a format specification for the data item.

In accordance with another embodiment of the present invention, there is provided a computer-readable medium having computer readable code embodied therein for use in the execution in a computer of a method of formatting data item values in reports. The method comprises the steps of collecting data value attributes and patterns for a data item in a report, and merging the collected data value attributes and patterns into a format specification for the data item.

In accordance with another embodiment of the present invention, there is provided a computer program product for use in the execution in a computer of a value formatting system for determining format specifications in reports. The computer program product comprises a format collection unit for collecting data value attributes and patterns for a data item in a report, and a format merging unit for merging the collected data value attributes and patterns into a format specification for the data item.

DETAILED DESCRIPTION OF THE PREFERRED EMBODIMENTS

Figure 1:
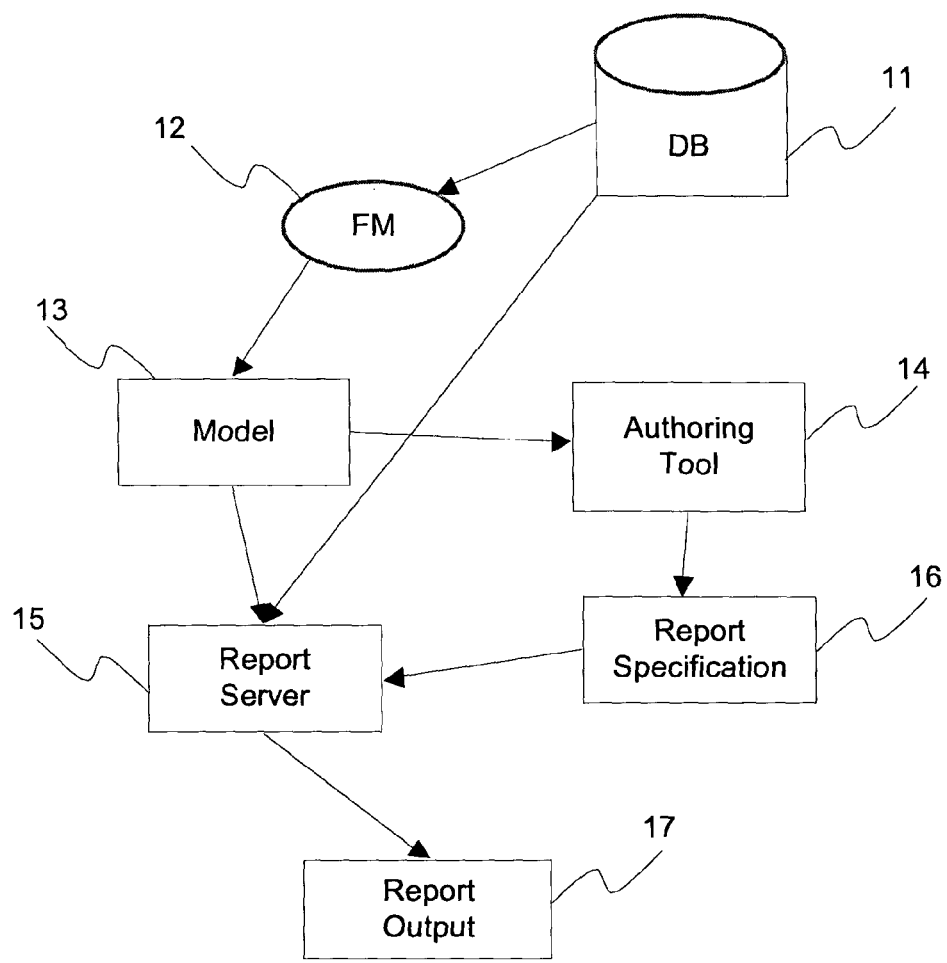
FIG. 1 provides a general overview of how a report output page is typically generated.

FIG. 1 provides a general overview of how a report output page is typically generated. Arrows indicate the direction of dataflow. The framework manager 12 reads structures of tables and columns in database 11, generates relationships between the tables, adds additional queries, calculations, conditions and run-time value prompts, and builds and publishes a model 13 comprising these definitions for consumption by an authoring tool 14 and report server 15. The authoring tool 14 uses the model 13 as a table of contents from which to build a report specification 16. The report server 15 uses the model 13 to generate queries (such as structured query language (SQL) and multidimensional expression (MDX) queries) from the report specification 16. The report specification 16 generated by the authoring tool 14 specifies how a report server 15 is executed to render one or more than one pages of report output 17. A rendering engine in a report server 15, for example, uses the model 13 to generate SQL and MDX queries from the report specification. These queries are executed against the database and data values are returned. Retrieved data values are formatted and arranged according to the layout definitions in the report specification 16, and then rendered to the user as pages of report output 17.

A report output can be one of, but not limited to: a printed paper page, a hypertext markup language (HTML) web page, a file encoded in a markup language for report output though a computer application, a page presented on a display or an encapsulated file types such as PostScript™, or portable document format (PDF), etc.

Rendering is the process of utilizing the information stored in a database to produce the report output 17 from the authored report specification 16. The report specification can be considered as a template for the report output that defines everything that is needed to produce the report output except the data. Building this template is known as "authoring" the report specification. The rendering process merges this template with the data values returned from the database or repository in order to generate the desired report output.

Typically, a format specification is defined for the data rendered in a report. Sometimes, it is desirable for the data format specification in a report to be different than the format specification of the corresponding data stored in a repository. Formatting is defined as the process of converting a data value from its internal format into a string of characters for display purposes. It is also used to describe parsing a string value into its internal format. Both operations are typically applied on a conditional basis.

Note that font properties, borders, patterns, colours, justification and alignment are examples of style specifications, as opposed to formatting. To distinguish between them, consider formatting as preparation of the [string] content of a given text item, whereas styling is the presentation of that content within the text item.

Formatting of data values may be achieved with the assistance of the international components for Unicode (ICU) library of format classes as exposed through internationalization (I18N) classes in the common components library (CCL). There exist several classes for the major data types: string, number, currency, percentage and date-time. Formatting for other data types may be provided by a combination or subset of these classes, notably date, time and interval.

Figure 2:
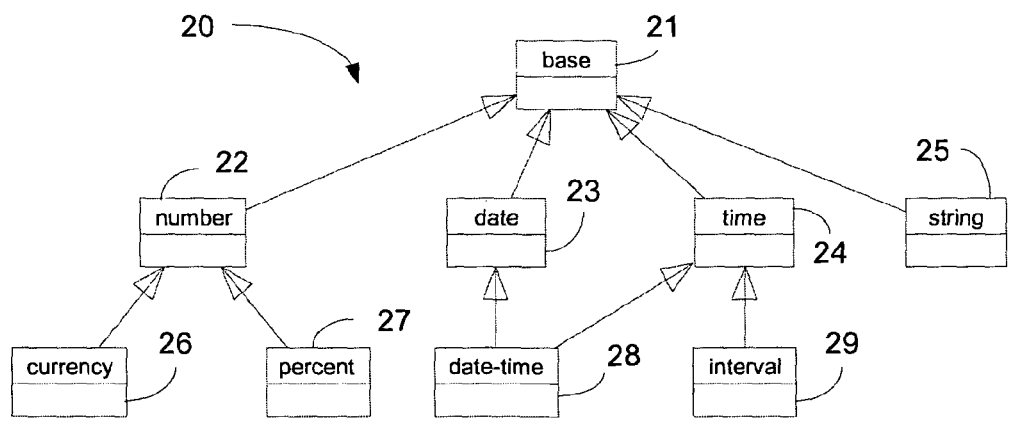
FIG. 2 shows an example of a format type hierarchy, in accordance with an embodiment of the present invention.

FIG. 2 shows an example of a format type hierarchy 20, in accordance with an embodiment of the present invention. Format specifications may be defined in a markup language schema (such as the extensible markup language (XML) Schema) definition for the report specification. Each format type may impose an algorithm to render a data value, some of which may be inherited from other types. Format types include a base 21 format type. A number 22, data 23, time 24, and string 25 format type may inherit properties and methods from the base 21 format type. A currency 26 and percent 27 format type may inherit properties and methods from the number 22 format type. A data-time 28 format type may inherit properties and methods from both the date 23 and time 24 format types. Finally, an interval 29 format type may inherit properties and methods from the time 24 format type. Other format types may be generated and included in the hierarchy 20.

A format specification is applicable against a specific value type: for example, numeric 22 formats are sensible when applied to numbers, and date 23 formats return meaningful results when applied to a date or date-time value. The data type of the data item in a result set of a data query usually implies its value type; hence, the appropriate default format may be selected from the data type.

Data values of date 23 or currency 26 data type are not necessarily formatted as dates or currency. A string data 25 item, which may comprise alpha-numeric characters and other characters, may be set to contain only numeric values; hence, a string 25 can, in certain circumstances, be considered a numeric value type. A numeric format would return sensible results against this 25 data item even though its data type is string 25. Likewise, a date-time format applied to a numeric 22 or string 25 data item can return a sensible result if the raw data value contains eight numeric digits in YYYYMMDD configuration, with or without a subsequent time component in HHMMSS.SSS format. Other numeric digit combinations for date and/or time formats may be conceived.

In general, the format value type should not be constrained to any given set of data types. Although a format may expect a particular data type, the format can be applicable to values of any data type. The report author may explicitly ask to format a data item as a specific value type (known as a "cast") by specifying the appropriate format for that data item. When an unintelligible value is encountered (e.g., a numeric format against an alpha-numeric string such as "K1G4K9"), the format algorithm should return an error.

A data item may be defined using attributes or patterns. Attributes of a data item may be obtained from various data item sources, as described below. A data item pattern may be obtained from a data item source or defined by a user. An example of a data item pattern is setting a currency amount to "$#,##0.00" for being in the tens of dollars. Examples of data item attributes include:

a currency symbol attribute, such as "$" for dollar;
a thousands separator attribute, such as a Boolean variable indicating that every three digits to the left of a decimal point in a dollar amount should be separated by a space or a comma;
a decimal attribute, such as an integer value indicating the number of digits to the right of a decimal in a number value;
a leading zero attribute, such a Boolean value indicating if a numeric value should have leading zeros; and
a negative attribute, such as a minus sign before a numeric value, or placing the numeric value in parenthesis.

Other data item attributes may be conceived.

Data item format specifications may be defined in various locations, including:

1. Factory default settings, such as ICU;
2. System configurations, such as operating system settings;
3. User preferences, such as client settings in applications or operating systems;
4. Data models, including a global model, and individual model items; and
5. Report specifications, including the report layout, the report frame (list), and individual report items.

With respect to the above 5 locations, a reporting application may encapsulate factory default settings (location 1). Locale/Regional settings for operating systems may embody system configurations (location 2). User preferences (location 3) may be embodied within a reporting application in that each user may have their personal preference settings. It is possible to inherit some or all preferences from membership within roles and/or workgroups. The model 13 in FIG. 1 embodies a data model (location 4). The report specification 16 in FIG. 1 embodies report specifications (location 5).

Each location above may have a different format specification for data values. For example, currency may be defined as follows:

1. In United States dollars using the "$" symbol in the factory settings;
2. In Canadian dollars using the "$" symbol in the system configuration;
3. In European Euros in the user preferences;
4. In United States dollars in the global data model;
5. In Canadian dollars in a data model item for Canadian sales;
6. In United States dollars in the report layout;
7. In a list/crosstab/chart/report, all currency values have 2 decimal places; and
8. In Canadian dollars for a report layout item for Canadian sales.

Format specifications for the same value type are merged together when rendered. As each new format is merged, any specified attributes in the new format will override any value for the same attribute in any of the previously merged formats. Format specifications can be gathered and merged in the same order as an inheritance model for parameters, as follows (lowest to highest order of precedence):

Reporting application factory default. Pre-defined factory default formats for each value type are hard-wired (compiled into a reporting application) for each supported content locale.

Any server configuration format preferences managed by the server administrator.

Any user format preferences managed by the users themselves.

Any application [model package] format preferences managed by the model author. Format specifications may be specified on any model component, and will be inherited according to the hierarchy within a model specification.

Parent layout component format. Format specifications may be specified on any layout component, and will be inherited according to the layout hierarchy within the report specification.

Associated model subject item format. A model author may also add formatting to individual items in a query subject. When that subject item is exposed as a data item in a report query, an application server may recognize any associated format. If it is used in a calculation, its format cannot be recognized.

Associated query item (<dataItem> or <item> in a <BIQuery>).

Report layout item formats. Format specifications may be specified for any layout item (i.e., <textItem>).

If patterns are defined in any of the above format specifications, the last one encountered during resolution of format overrides may be used. Otherwise, the attribute specifications may be used to devise a format pattern. Note that any pattern specified in any format for the given value type may override all attributes, no matter where they are specified. In other words, to override a pattern, the author may specify another pattern.

It should be noted that an alternative implementation may provide the precedence list in reverse order. In such an alternative implementation, the formats are merged in that order of precedence, then attributes in the previously merged format take precedence over attributes in the new format. For example, an attribute on a report layout item format would take precedence over an attribute on the associated query item format. The attributes on the result of this merge would take precedence over any similar attributes on the associated model subject item format, etc.

A format specification may also be associated with a locale. When selecting among multiple formats of the same value type for rendering purposes, the specification whose locale matches the content language may be selected. If none are found, the format without a locale association may be selected.

Figure 3:
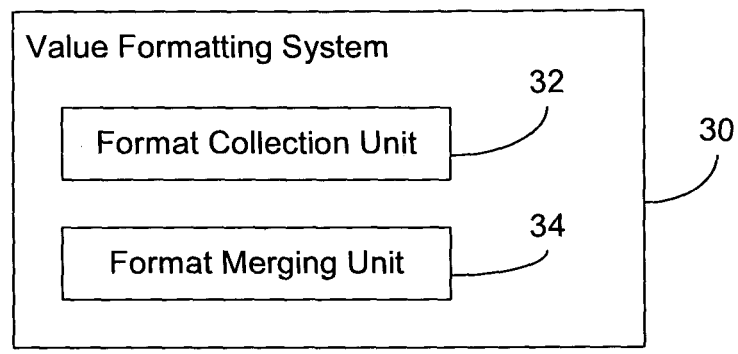
FIG. 3 shows an example of a value formatting system for determining a format specification in a report, in accordance with an embodiment of the present invention.

FIG. 3 shows an example of a value formatting system 30 for determining a format specification in a report, in accordance with an embodiment of the present invention. The value formatting system 30 comprises a format collection unit 32 for collecting data value attributes and patterns for a data item in a report, and a format merging unit 34 for merging the collected data value attributes and patterns into a format specification for the data item.

Figure 4:
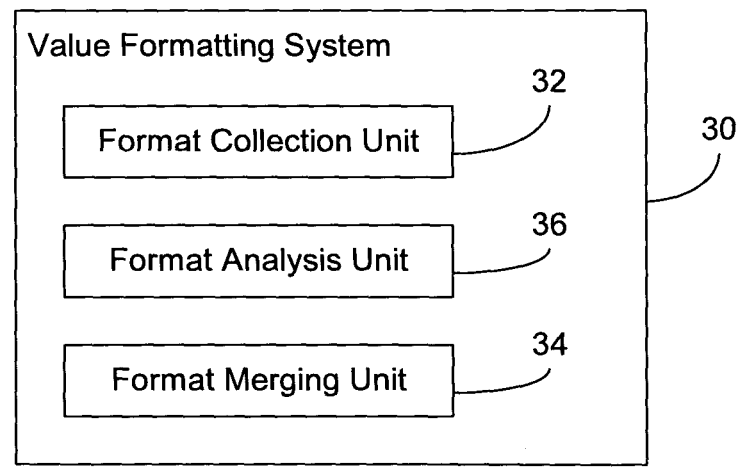
FIG. 4 shows another example of the value formatting system.

FIG. 4 shows another example of the value formatting system 30, further comprising a format analysis unit 36 for analysing and ordering the collected data value attributes and patterns into a parameter precedence hierarchy as described above. Other units may be added to the value formatting system 30, including a format repository for storing the data value attributes and patterns, and a rendering unit for rendering the data item to a report using the merged format specification.

Figure 5:
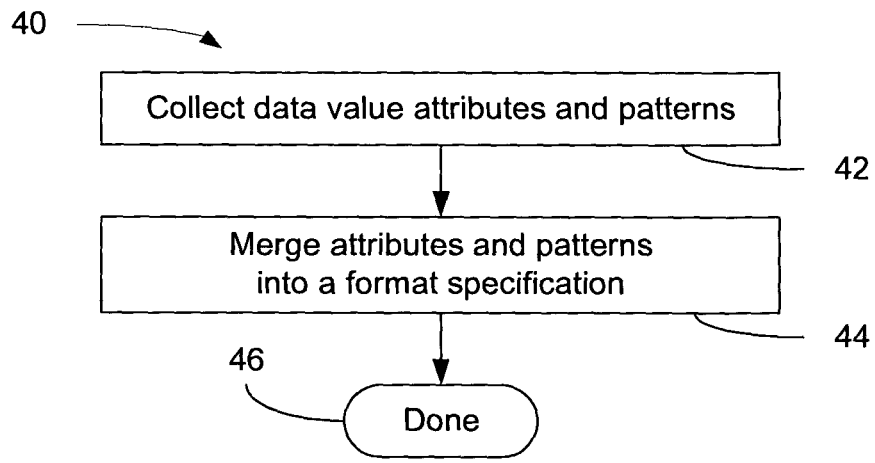
FIG. 5 shows in a flowchart an example of a method of formatting a data item value, in accordance with an embodiment of the value formatting system.

FIG. 5 shows in a flowchart an example of a method of formatting a data item value (40), in accordance with an embodiment of the value formatting system 30. The method begins with collecting data value attributes and patterns for a data item in a report (42) from the various locations described above. Once collected (42), the attributes and patterns are merged into a format specification for the data item (44). The method (40) is done (46). Other steps may be added to the method (40), such as storing the collected data item attributes and patterns in a repository, and rendering the data item to a report using the merged format specification.

Figure 6:
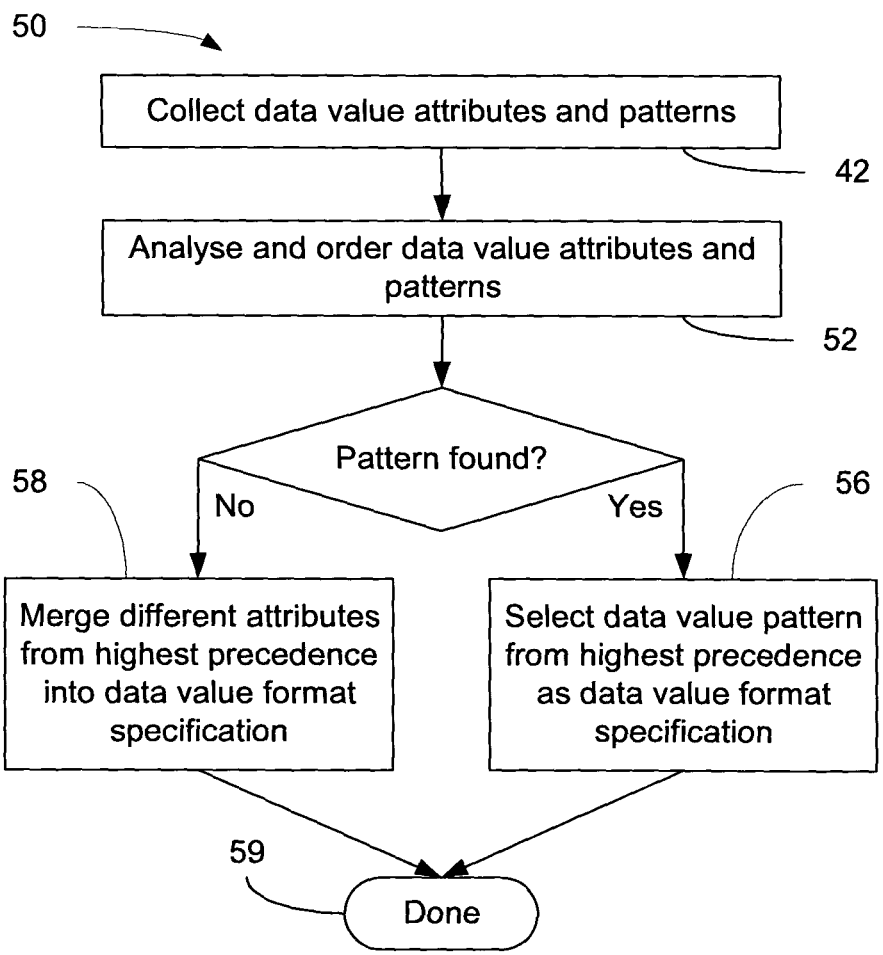
FIG. 6 shows in a flowchart another example of the method of formatting a data item value in more detail.

FIG. 6 shows in a flowchart another example of the method of formatting a data item value (50) in more detail. The method begins with collecting data value attributes and patterns for a data item in a report (42) from the various locations described above. Once collected (42), the data item attributes and patterns are analyzed and ordered (52) into a parameter precedence hierarchy as described above. If a data value pattern is found (54), then the data value pattern with the highest precedence is used as the data value format (or format specification) (56). If a data value pattern is not found (54), then a data value format is created when different attributes, each of the highest precedence, are merged together (58) to form a format specification. Once merged (58), the method (50) is done (59).

Figure 7:
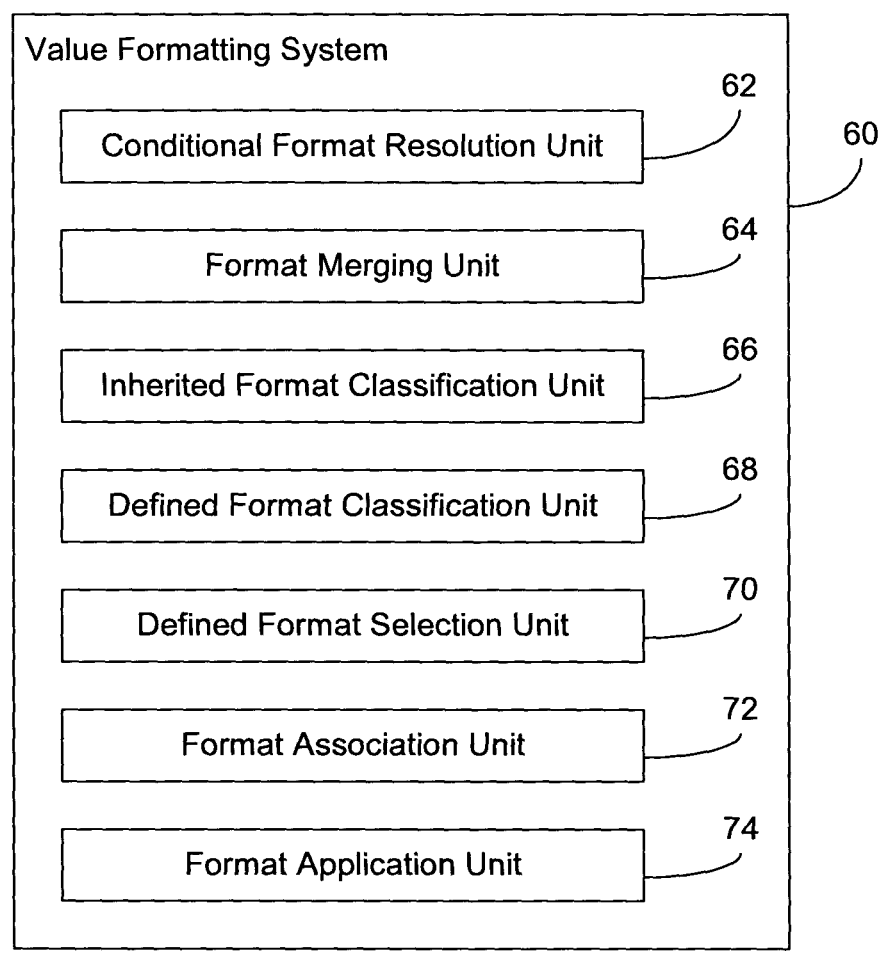
FIG. 7 shows another example of a value formatting system, in accordance with an embodiment of the present invention.

FIG. 7 shows another example of a value formatting system 60, in accordance with an embodiment of the present invention. The value formatting system 60 comprises a conditional format resolution unit 62 for processing any conditional formatting styles set in the reporting application, a format merging unit 64 for gathering and merging format specifications from various sources, an inherited format classification unit 66 for gathering and merging inherited (or default) format specifications from various sources, a defined (or explicit) format classification unit 68 for gathering and merging defined format specifications from various sources, a defined format selection unit 70 for selecting a defined format specification from the classified format specifications, a format association unit 72 for associating the selected defined format specification to a corresponding inherited format specification, and a format application unit 74 for applying the associated format specification to a data item value. Other units may be added to the value formatting system 60, such as a rendering unit for rendering the data item value to a report. Three are various ways of encoding a format specification. The description below is described using XML.

Figure 8:
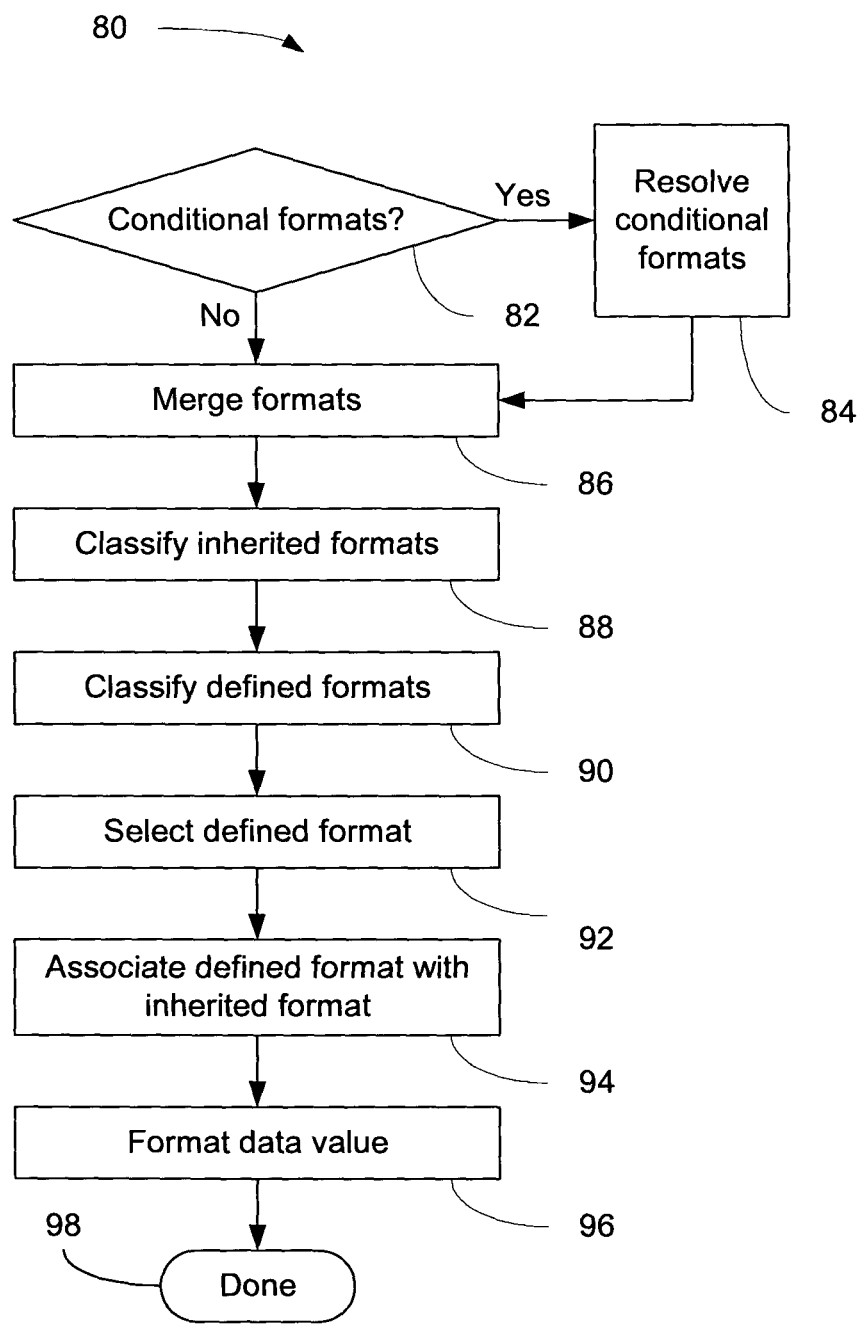
FIG. 8 shows in a flowchart another example of a method of formatting a data item value, in accordance with an embodiment of the value formatting system.

FIG. 8 shows in a flowchart another example of a method of formatting a data item value (80), in accordance with an embodiment of the value formatting system 60. The method (80) begins with determining if there are any conditional formats (82). If there are, the conditional formats are resolved (84). Conditional formats are declared in XML layout specifications of a report layout as formats within a conditional style. For any given event context (or data row), a <conditionalStyle> will return a set of zero, one or many format elements corresponding to the contents of the <style> element selected by the current value of the conditional variable. Only those formats selected will participate in the rendering of the value; all other formats will be ignored. It is possible that no conditional formats are declared.

Once conditional formats are resolved (84) or if there are no conditional formats (82), then format specifications are merged (86). As noted above, format elements from several sources may participate in rendering a value. In addition, any source may specify more than one format element for the same value type, especially for multiple conditional formats. Merging two format specifications into one replaces the attributes in the first specification with those specified in the second. An example of an inheritance model is described above with respect to FIG. 2.

Formats are merged by type of format, plus any other identifying characteristics. The types, described below, include: String Format, Number Format, Currency Format, Date-Time Format, etc. Some of these format types may be further identified by their attributes. For example, each Currency Format may be identified by its currencyCode attribute. Typically, currency formats for different currencies are not merged together.

Once format specifications are merged (86), inherited formats are classified (88). Inherited (or default) formats participate in the rendering of a value, but do not cast any specific data value. These formats are gathered and merged from the various sources described above.

Once inherited formats are classified (88), defined formats are classified (90). Defined (or explicit) formats not only participate in the rendering of a specific value, they may also cast the value type for formatting purposes. These formats are gathered and merged from various sources described above.

Once defined formats are classified (90), a defined format is selected (92). Any data value will have a (possibly empty) set of defined formats after the previous steps of selecting, merging and classifying format elements. If the set is empty, the data type of the value implies its default value type for formatting purposes, as if an empty format element of that value type had been specified. If the set contains only one defined format element, the data value is cast to the value type suggested by the single format. If the set contains two or more defined format elements, select the closest match based upon the value type as implied by the data type of the value.

Once a defined format is selected (92), the defined format is associated with a corresponding inherited format (94). In one embodiment, the inherited format is merged with the defined format by overriding the inherited format with a copy of the defined format. Once the defined format is associated with a corresponding inherited format (94), the data item value is formatted (96) with the associated defined format specification. Once the value is formatted (96), the data item may be rendered and the method (80) is done (98).

Advantageously, the value formatting systems 30, 60 and methods 40, 50, 80 allow data formatting to default to the correct format based on the users locale—without the customer providing specific formatting for a given data element. Therefore, reporting applications that implement the value formatting systems 30, 60, should have a known set of locale specific formats "built-into" the product to be used when no customer data formatting has been provided (i.e., factory default settings). Ideally, this list is customer extensible and customizable. Within a report, both query data and report expression results (timestamp for example) are format-able.

By default, the format floats based on the user (readers) locale. Where the author has provided a specific data format, that format is used in favor of the default based on the users locale.

Report authors are able to determine whether to specify a fixed format, format by locale or use the users locale format. Note that the author is not forced to specify the entire format to affect one portion on it. For example, the author is able to display a number with 3 decimal places without being forced to specify the entire format—as that would require either fixing the format or specifying it for every locale.

Authors are able to specify formats using conditional formatting. Authors are able to view the formatting set in the metadata model and to revert back to that formatting as required. Subject to limitations in ICU, it is possible to specify multiple values for any format element such as currency symbol, negative sign and so on for any data type. It is possible to specify formatting by language/locale.

In addition, the value formatting systems 30, 60 may define default formats for every format type in every locale; have format specifications override similar specifications from various product areas; have any layout item formats override all previous format specifications, including patterns, attributes, and format types to be applied; merge format specifications of similar type according to an inheritance model; have a model usage property (fact, attribute, identifier, etc.) influence the default format.

Data Item Types

Data items values may be of various types. Described below are examples of character, numeric, currency, time, and date types. Other types may be conceived.

Character Data:

Data formatting for character data provides options to up or downshift the first or all characters and to add literals to the presentation.

Numeric:
The formatting capabilities for numbers are as follows:
1 Decimal symbol
  Example: 1 1.1 or 1,1
2 Number of digits after the decimal
  Example: 1.12 or 1.1
3 Digit grouping symbol
  Example: 1,000 or 1 000
4 Digit grouping
  Example: 123,456,789 or 12,34,56,789 or 123456789
  Example: 123 456 789 or 12 34 56 78 or 123456789
5. Negative
  Negative can be expressed as either a symbol or the use of parenthesis. Parenthesis are applied last. There is no space between the ( ) and formatted number. For example (1.12).
  The user is able to specify the symbol to be used. "–" is typically used. The user is able to specify the location of the symbol, i.e., before or after the number. The user is able to specify whether the symbol is separated from number by a space. For example, "1.12–" and "–1.12" are both valid.
  Japanese Sankaku marks: In Japan, there are 5 accepted negative symbols [plus ( )]. The negative sign "–" and 4 triangular indicators:

| Shift-JIS | Unicode |
|---|---|
| Δ: 0x81A2 | U + 25B3 |
| ▲: 0x81A3 | U + 25B2 |
| ∇: 0x81A4 | U + 25BD |
| ▼: 0x81A5 | U + 25BC |

6. Display or suppress leading zeros
  Example: "0.7" or "0.7". The customer is able to determine how many leading zeros to display. Preferably, one (1) is the default.
7. Percentages
  Example: "56%". The scale (×100) is applied automatically.
8. Scientific Notation
  Required for industries such as pharmaceuticals.
9. For a single data item, it shall be possible to specify independent formatting for positive, negative, 0 and missing values.

Currency:
Preferably, a customer may specify the currency symbol and number of decimals points only and have that combined with number format from the users locale. The numeric and currency format should be fixed as required.

Time:
Users performing most end-user and admin tasks operate in their local time regardless of server-client time differences. An exception to this is audit and logging information that use a common time across servers in different time zones to allow for tracing of activities between servers easily. Preferably, universal time coordinated (UTC) is used internally and for audit and trace logs with translation to the users local time for other purposes. Preferably, time formats support:
  12 and 24 hour, minutes, and seconds;
  whether to retain or drop leading zeros;
  an am or pm indicator (AM/PM or a.m./p.m.); and
  a separator character (-, :, ., <blank>).

Date:
The value formatting system 30, 60 may support both Gregorian (January, February, etc.) and Japanese Imperial (Year of . . . ) calendars for both prompting users for report date parameters and displaying dates within reports. Other calendars may be implemented such as Hebrew, Islamic Hijri lunar, Chinese or other calendars. For Gregorian dates, data may be specified to be displayed as either a long or short date which result in the long or short date format for the users locale being applied. When displaying dates in Japanese formats, an option to use English month names may be provided.

The following date format options may be provided:
  Month
    Numeric
    retain leading zero
    Character
      Full name (January)
      Abbreviated name (Jan)
      Shifted (January and janvier)
  Year
    2 or 4 characters
  Day
    Numeric (1-7)
    Character
      Abbreviated name
      Full name
  Separator character for short dates
  Literals
    Example, can repeat date elements
    Example (from Windows 2000) dddd, MMMM dd, yyyy results in the format of Thursday, Sep. 20, 2001.

Data Item Format Specification Definitions
Examples of data item format specification definitions are provided below for determining currency formatting and basic XML format support. Other data item format specification definitions may be conceived.

Determining Currency Formatting
Before formatting as currency, the value formatting system 30, 60 first determines that the value to be formatted is a currency. Having done so, the system 30, 60 then determines which specific currency it is. Then the system 30, 60 merges/selects the appropriate currency format.

Figure 9:
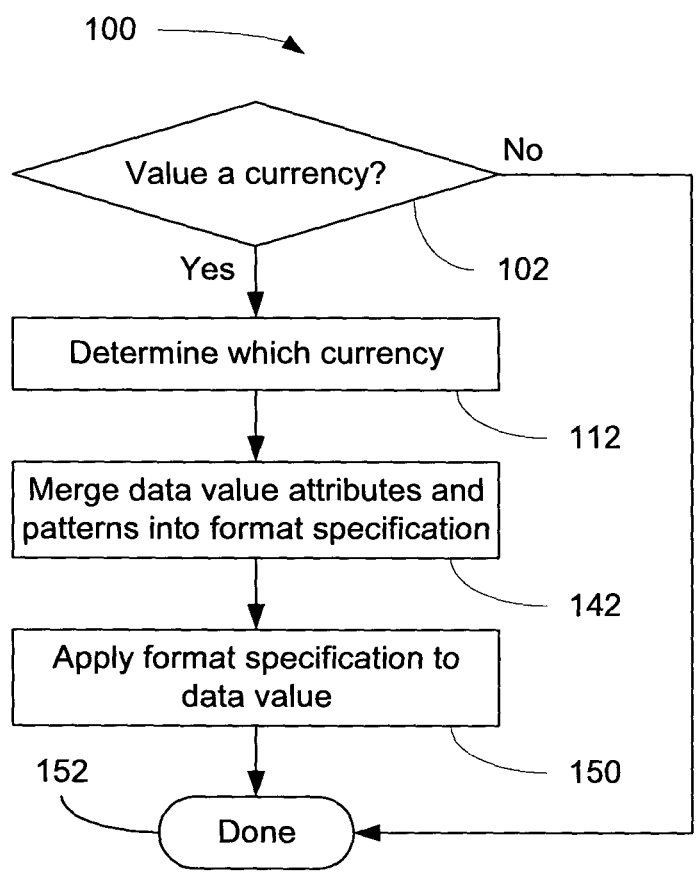
FIG. 9 shows in a flowchart an example of currency formatting, in accordance with an embodiment of the value formatting system.

FIG. 9 shows in a flowchart an example of currency formatting (100), in accordance with an embodiment of the value formatting system 60. The method (100) begins with determining if a value is a currency (102). If the value is not a currency (102), then the method (100) is done (150). If the value is a currency (102), then the next step is to determine which currency the value is (112). Once which currency is determined (112), collected data value formats (i.e., attributes, etc.) are merged into a format specification for the currency value (142). Once the format specification is merged (142), it is applied to the currency value (150). Once the format specification is applied (150), the currency value may be rendered and the method (100) is done (152).

Figure 10:
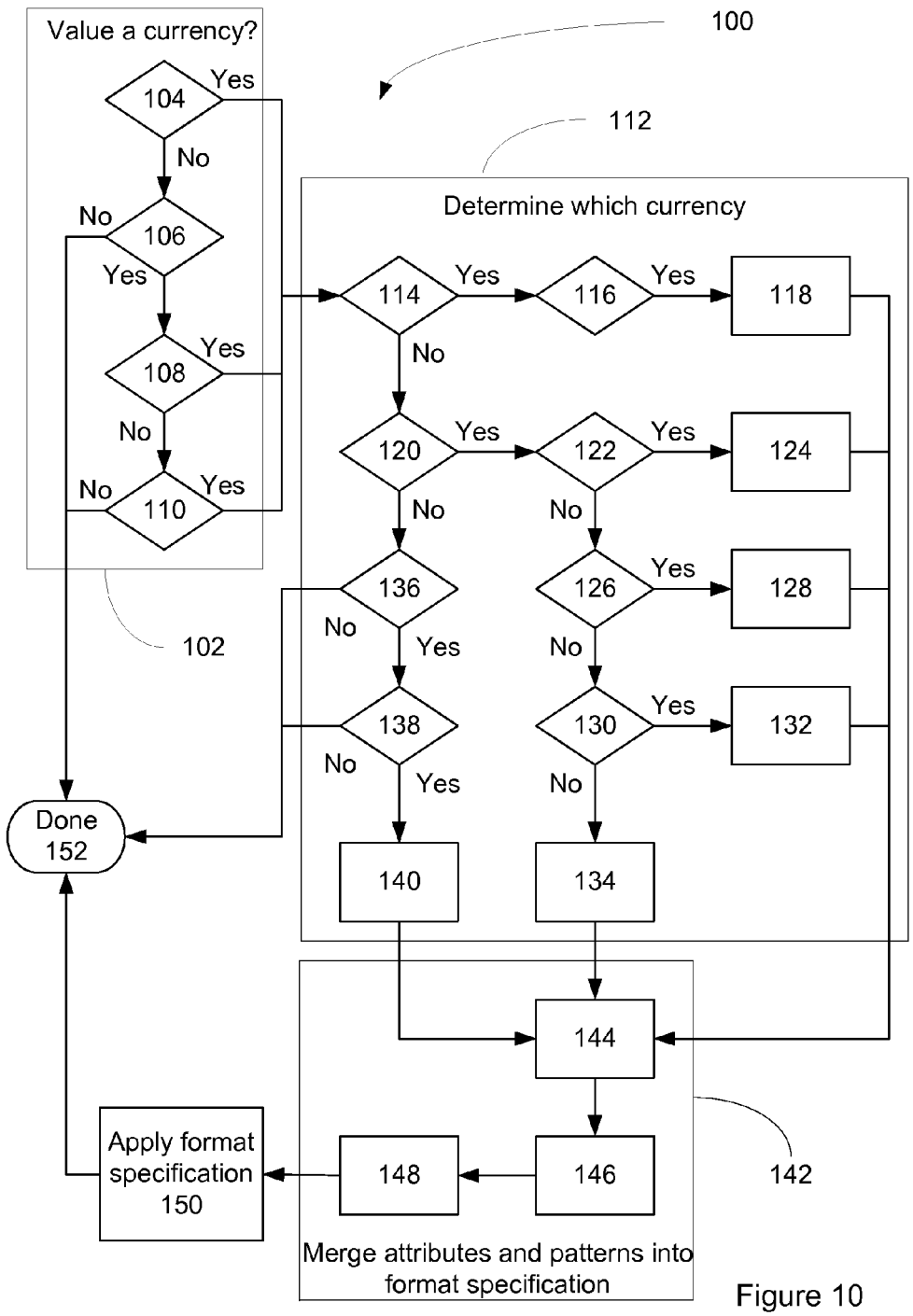
FIG. 10 shows in a flowchart another example of the currency formatting method, in more detail.

FIG. 10 shows in a flowchart another example of the currency formatting method (100), in more detail. Below is an algorithm that outlines detailed steps to the method (100).
1. Is the value a currency? (102)
  IF layout item to be formatted has defined one to many formats that are merged into one, and only one, currency format (104), then value is currency ELSE IF [QSAPI] returns a currency code with this value (106), then:
    IF layout item has defined two or more formats that are merged into two or more currency formats (108), then value is currency
    ELSE IF layout item has not defined any formats (110), then value is currency
    ELSE value is not currency
  ELSE value is not currency 2. If value is a currency (102), which currency is it (112)?
   IF layout item has defined one to many formats that are merged into one, and only one, currency format (114), then
      IF merged currency format on layout item defines a currency code (116), then use currency code on layout item currency format (118)
   ELSE IF layout item has defined two or more formats that are merged into two or more currency formats (120), then
      IF [QSAPI] returns a currency code with this value (122), then use QSAPI currency code (124)
      ELSE IF [QSAPI] returns one to many formats that are merged into one, and only one, currency format and that format defines a currency code (126), then use currency code on QSAPI currency format (128)
      ELSE IF parent layout components define one to many currency formats that are merged into one, and only one currency format and that format defines a currency code (130), then use currency code on merged currency format from layout parents (132)
      ELSE use currency code associated with run locale (134)
   ELSE IF layout item has defined one or more formats, none of which are merged into a currency format (136), then value is not currency (see above)
   ELSE IF [QSAPI] returns a currency code with this value (138), then use QSAPI currency code (140)
   ELSE value is not currency (see above)
3. Merge/Select format (142)
   Merge formats as described above (142)
   Find merged currency format with specific currency code selected in step 2 (112) above (144)
      a.k.a. "specific currency format"
   Find merged currency format without any defined currency code (146)
      a.k.a. "default currency format"
   Merge specific currency format into default currency format such that attributes on specific format override those on default format (148)
4. Merge/Select format
   After merge/select (step 3 (140) above) (148), apply resulting currency format to data value (150).

Basic XML Formats

Examples of basic XML formats, in accordance with an embodiment of the present invention are described below. The basic XML formats include string, number, decimal, scientific, percentage and per mille, currency, date, time, date-time, days interval, and months interval. Preferably, formatting classes in a reporting application will support the following properties, because a value formatting system 30, 60 implemented in the reporting application will implement them. Currently, these properties are not supported in ICU or I18N.

Attributes
1. refVariableValue
   Refers to a return value from a conditional expression (identified in ancestor element such as <style>) for which this format should be applied. Preferably, this attribute is always applied by default.
2. pattern
   Every format allows for specification of a pattern. Meta-characters and content of this attribute vary with each format specification. Any specified pattern will override all other attributes, except these Basic attributes. Preferably, no patters are defined by default.
3. xml:lang
   Locale for which format is applicable. Used to select format specification by content locale. Preferably, there are no locales by default.
4. whenMissing
   Characters to be displayed when value is missing (or null). If omitted, empty string is returned. Preferably, the empty value " " is displayed by default.

I18N support Preferably, a reporting application will implement this functionality. Preferably, the selection of the format using its locale (xml:lang) will be implemented by a rendering engine. If the value to be formatted is missing (or null), the rendering engine may simply display the value of the whenMissing attribute. Any specified pattern attribute may be passed to I18N directly.

String Format

The string format comprises a pattern that is copied to the rendered output. The string value of the data item replaces "^" meta-characters on a character-by-character basis. Any characters remaining in the string will replace the first "@" meta-character in the pattern.

If the string value is exhausted before any "@" meta-character is encountered, rendering stops immediately, effectively truncating the pattern. If any characters from the string value replace the "@" meta-character, then the remainder of the pattern will be rendered, including any remaining meta-characters. As such, if pattern="@^", a caret ("^") will always appended to the string value.

Attributes
1. pattern
   String substitution mask. Individual characters from the string are inserted in place of caret ("^") meta-characters. Remaining (unused) portion of string is inserted in place of "@" meta-character. Preferably, the "@" character is used by default.

Examples

| Data Value | Formatted Output |
|---|---|
| Append some characters: <stringFormat pattern="^^^@-CR"/> | |
| 90210 | 90210-CR |
| 902103461 | 902103261-CR |
| 315 | 315 |
| Very Long String | Very Long String-CR |
| American Zip Code: <stringFormat pattern="^^^^^-@"/> | |
| 90210 | 90210 |
| 902103461 | 90210-3261 |
| 315 | 315 |
| Very Long String | Very - Long String |
| Canadian Postal Code: <stringFormat pattern="^^^ ^^"/> | |
| K1G4K9 | K1G 4K9 |
| k1g4k9 | k1g 4k9 |
| Very Long String | Very - Long String |

Number Format

The number format comes in five flavours: number, currency and percentage; the default is number, which renders in integer, decimal or scientific format depending upon the data type of the item, the scale and the precision.

Decimal and scientific formats are described in the schema as subsets of the attributes of the <numberFormat> not because they should be separate elements in a report, but because it's easier to define inheriting format elements such as <currencyFormat> and <percentFormat>.

If specified, a pattern overrides any parameters that have influence on the patterns; only xml:lang, whenMissing and whenZero do not affect the pattern.

Decimal Format

The decimal format describes and applies all sign, decimal, grouping, precision and scale properties of the mantissa portion of a numeric format; exponentiation applies to scientific format.

Attributes 1. sign

Characters to be displayed before numeric value when it is negative. If a blank character is desired between numeric value and this sign, it should be specified in this attribute. When '('or')', negative value will be enclosed in parentheses and trailing sign indicator will be ignored. Preferably, the sign is inherited from user's locale.

2. useTrailingSign

When 'true', negative sign characters are appended to numeric value; otherwise, sign characters are inserted before numeric value. Preferably, this is inherited from user's locale.

3. decimalSize

Count of digits to be displayed to right of decimal point. For integer values, specify '0', wherein fractional [decimal] digits and decimal point will not be displayed. Preferably, fractional digits will be displayed as required by default.

4. decimalDelimiter

Character delimiter between whole and fractional components of a floating-point number. Also known as 'decimal point', this delimiter is applicable only when fractional digits are presented (i.e., decimalSize attribute is greater than zero). Preferably, these are inherited from user's locale by default.

5. maxDigits

Maximum count of digits to be displayed, including digits on both sides of the decimal point. When magnitude of the numeric value exceeds the precision value, scientific notation will be used. Preferably, these are inherited from user's locale by default.

6. minDigits

Minimum count of digits to be displayed, including digits on both sides of the decimal point. When magnitude of the numeric value is less than this value, padding characters will be inserted before numeric value. Preferably, these are inherited from user's locale by default.

7. paddingCharacter

Characters to be inserted before numeric value to ensure that it meets minimum size requirements. Preferably, these are inherited from user's locale by default.

8. scale

Number of digits to shift decimal place from actual location for display purposes; positive values shift the decimal place to the left, and negative values shift the decimal point to the right. This attribute is handy when displaying values in 'thousands of dollars'. Preferably, these are inherited from user's locale by default.

9. useGrouping

When 'false', use of grouping separators will be inhibited; otherwise, grouping separators will be shown. Preferably, these are inherited from user's locale by default.

10. groupDelimiter

Character delimiter for digit groups. Also known as the 'thousands separator', it is applicable only when grouping separators are shown. Preferably, these are inherited from user's locale by default.

11. groupSize

This is the primary grouping size, which represents the count of digits left of the decimal point to be grouped together and separated by groupDelimiter character. Preferably, these are inherited from user's locale by default.

12. groupSecondarySize

Some locales support a secondary grouping size that is applied to the left of the primary group. If specified, this attribute is the count of digits left of [primary] digit group that should be grouped together and separated by groupDelimiter character. Preferably, this is received from the primary grouping size (e.g., groupSize) by default.

13. whenZero

Characters to be displayed when numeric value is zero. If omitted, significance attribute determines number of zeroes to display. Preferably, the "0" character is used by default.

14. whenNegative

Characters to be displayed when numeric value is less than zero. If omitted, sign character is inserted/appended to positive format. Preferably, "–#0" is used by default.

15. pattern

Numeric substitution mask for positive values. Preferably, meta-characters are similar to those in spreadsheet applications. All number formats support a two-part pattern. The first part of the pattern is used when the numeric value is positive; the second part is used when the numeric value is negative. If specified, negative pattern overrides whenNegative attribute (see below). Preferably, "#0" is used by default.

Examples

| Data Value | Formatted Output |
|---|---|
| Comma as decimals: <numberFormat decimalDelimiter=", " groupingdelimiter=" "/> | |
| 12345.987 | 12 345,987 |
| –12345.987 | –12 345,987 |
| 0 | 0 |
| Explicit Integer: <numberFormat decimalSize="0" whenZero="—"/> | |
| 12345.987 | 12346 |
| –0.12345.987 | –12346 |
| 0 | — |
| Japanese Negative: <numberFormat sign="▲" decimalSize="0"/> | |
| 12345.987 | 12346 |
| –12345.987 | ▲ 12346 |
| 0 | 0 |
| Phone Number: <numberFormat pattern="'('###')' '000'-'0000'"/> | |
| 7381338 | 738-1338 |
| 6137381338 | (613) 738-1338 |
| 12345.9 | 001-2346 |

I18N Support

Preferably, decimal Format is defined as a subset of the attributes of <numberFormat> element (see Number Format above). ICU Decimal Format class implements the decimal format specification. The whenNegative pattern (if any) is appended to positive pattern, delimited with a semi-colon [NB: delimiter is locale-dependent]. Since ICU does not provide support for whenZero string, I18N will have to detect zero values and substitute the value of the whenZero attribute.

| Attribute | I18NNumberFormat:: method |
|---|---|
| sign | setNegativePrefix and/or setNegativeSuffix |
| useTrailingSign | useTrailingSign |
| decimalSize | setMaximumFractionDigits |
| decimalDelimiter | setDecimalSeparator |
| maxDigits | setMaximumIntegerDigits(maxDigits − decimalSize) |
| minDigits | setMinimumIntegerDigits |
| paddingCharacter | setPaddingCharacter |
| scale | setScale |
| useGrouping | useGrouping |
| groupDelimiter | setGroupingSeparator |
| groupSize | setGroupingSize |
| groupSecondarySize | setSecondaryGroupingSize |
| whenZero | setWhenZero |
| whenNegative | setWhenNegative |
| pattern | setPattern |

Scientific Format

The scientific format builds upon decimal format specifications by adding exponentiation support. This support is implemented by additional attributes of <numberFormat> element.

Attributes

In addition to the attributes applicable to any decimal format, the following are supported:

1. exponentSize

Minimum count of digits to be displayed to right of exponent symbol. Preferably, these are inherited from user's locale by default.

2. exponentSymbol

Characters to be displayed to identify exponent. Preferably, these are inherited from user's locale by default.

3. useScientific

When 'true', value is always formatted in scientific notation; otherwise, scientific notation will be applied if magnitude of value (plus or minus) exceeds maxDigits attribute. Preferably, by default, this is set to 'true' if one of the above attributes is specified; else 'false'.

Examples

| Data Value | Formatted Output |
|---|---|
| Conditional scientific notation: <numberFormat maximumSize="5"/> | |
| 12345.987 | 12346 |
| 123459.87 | −1.2346E+05 |
| 0.00012345987 | 0.0001 |
| 0.000012345987 | 1.2346E−05 |
| Explicit decimals: <numberFormat decimalSize="5" useScientific="true"/> | |
| 12345.987 | 1.23460E+04 |
| −0.12345987 | −1.23460E−01 |
| 0 | 0.0E+00 |
| Custom Exponent: <numberFormat exponentSymbol="x10**" whenZero="--"/> | |
| 12345.987 | $1.2345987 \times 10^{**} + 04$ |
| −0.12345987 | $-1.2345987 \times 10^{**} - 01$ |
| 0 | — |

I18N Support

Preferably, Scientific Format is defined as a subset of the attributes of <numberFormat> element (see Number Format above). Like the decimal format, the ICU Decimal Format class implements scientific format. With the exception of additional support for exponentiation, implementation of this format specification is identical to the decimal format.

| Attribute | I18NNumberFormat:: method |
|---|---|
| exponentSize | setMinimumExponentDigits |
| exponentSymbol | setExponentSymbol |
| useScientific | useScientific |

Percentage and Per Mille Formats

A percentage format refines a decimal format, and provides all of the same methods. Numeric values are scaled by −2 (percent) or −3 (per mille) after applying any explicit scale attribute.

Attributes

In addition to the attributes applicable to any decimal format, the following are supported:

1. percentSymbol

Characters to be displayed to identify percent ('%') or per mille ('‰') value. These characters will be appended to the numeric value and any trailing sign. If a blank character is desired between numeric value and this symbol, it should be specified in this attribute. Preferably, this is inherited from user's locale by default.

2. percentScale

Scale to be applied to value prior to formatting. This value complements the scale attribute and is applied after any numeric scaling. If omitted, percent scale will be determined from specified or inherited percent symbol. When per mille symbol ("‰" or \u2030) is used defaults to −3; otherwise, −2. Preferably, this is inherited from user's locale by default.

Examples

| Data Value | Formatted Output |
|---|---|
| Percentage: <percentFormat decimalSize="2"/> | |
| 0.05436 | 5.44% |
| 5.436 | 543.60% |
| Scaled Percentage: <percentFormat scale="1" decimalSize="2"/> | |
| 0.05436 | 0.54% |
| 5.436 | 54.36% |
| Per mille: <percentFormat percentSymbol="‰"/> | |
| 0.05436 | 54.4‰ |
| 5.436 | 5436‰ |
| Scaled Per mille: <percentFormat scale="1" decimalSize="2" percentSymbol="‰"/> | |
| 0.05436 | 5.44‰ |
| 5.436 | 543.60‰ |

I18N Support

ICU Decimal Format class implements percent format specifications. When the format object is created, the default multiplier must be set to 1000 when the percent symbol is set to "‰"; otherwise, the default multiplier should be set to 100; otherwise, the implementation of this format specification is identical to the decimal format.

| Attribute | I18NNumberFormat:: method |
|---|---|
| percentSymbol | setPercentSymbol/setPerMilleSymbol |
| percentScale | setMultiplier |

Currency Format

A currency format refines a decimal format, and provides all of the same methods.

Attributes

In addition to the attributes applicable to any decimal format, the following are supported:

1. currencyCode

Unique code that identifies format currency. This format specification will be applied to values whose currency identification matches this value. ISO 4217 currency code is recommended. Preferably, this is inherited from query metadata by default.

2. currencySymbol

Characters to be displayed to identify currency of the numeric value. If a blank character is desired between value and this symbol, it should be specified in this attribute. Preferably, this is inherited from configuration by default.

3. intlCurrencySymbol

Characters to be displayed to identify international currency of the value. Behaves like currencySymbol attribute (see above). Preferably, this is inherited from configuration by default.

4. useIntlSymbol

When 'true', intlSymbol will be used; otherwise, currencySymbol will be used. Preferably, this is inherited from user's locale by default.

5. useTrailingSymbol

When 'true', characters in symbol attribute will be appended to the numeric value and any trailing sign; otherwise, symbol precedes numeric value and any leading sign. Preferably, this is inherited from user's locale by default.

Each currency format contains a unique currency code to identify the currency. This attribute is usually mandatory: the sole exception is a currency format specification within the text item to be formatted, thus indicating that the value is to be formatted as the currency identified by the model.

Preferably, a reporting application having the value formatting system 30, 50 will apply the [inherited] currency format specification that matches the currency code in the metadata for the query item; if none is found, default model locale will be used. If the format in the text item contains a currencyCode attribute, it is used to identify the currency of the value to be formatted, possibly overriding the query item metadata.

Examples

| Data Value | Currency Code | Formatted Output |
|---|---|---|
| Default Currency: <currencyFormat/> | | |
| 12345.987 | USD | $12,345.99 |
| 12345.987 | JPY | ¥ 12346 |
| International Currency: <currencyFormat useIntlSymbol="true"/> | | |
| 12345.987 | USD | USD 12,345.99 |
| 12345.987 | JPY | JPY 12346 |
| Currency Override: <currencyFormat currencyCode="JPY"/> | | |
| 12345.987 | USD | JP¥ 12346 |
| 12345.987 | JPY | JP¥ 12346 |

I18N Support

ICU Decimal Format class implements currency format specifications. The currency format object must be created via the appropriate constructor. The unique currencyCode provided to identify the currency must be mapped to an ICU locale before the currency format object can be constructed; otherwise, ICU will choose a default currency based upon the server locale. The remainder of the implementation of this format specification should be identical to the decimal format.

| Attribute | I18NNumberFormat:: method |
|---|---|
| currencyCode | not applicable - used to select format for appropriate currency |
| currencySymbol | setCurrencySymbol |
| intlCurrencySymbol | setInternationalCurrencySymbol |
| useIntlSymbol | useInternationalCurrencySymbol |
| useTrailingSymbol | setTrailingCurrencySymbol |

Date Format

The date format properties are applicable to date, date-time and [YMD] interval value types.

Attributes 1. dateStyle

Four pre-defined date formats are provided as implemented by ICU: 'short', 'medium', 'long', and 'full'. Preferably, this is inherited from user's locale by default.

2. showYears

When 'false', year is hidden. When 'true', year is shown with/without century, as per locale. When 'hideCentury', first two digits (century) are hidden. When 'showCentury', all digits are shown (i.e. century included). Preferably, this is inherited from user's locale by default.

3. showMonths

When 'false', month is hidden. When 'true', 1- or 2-digit month is shown, as per locale. When '1-digit' or '2-digit', 1- or 2-digit month is shown, respectively. When 'shortName' (or 'fullName'), abbreviated (or complete) month name is shown. Preferably, this is inherited from user's locale by default.

4. showDays

When 'false', day of month is hidden. When 'true', 1- or 2-digit day is shown, as per locale. When '1-digit' or '2-digit', 1- or 2-digit day is shown, respectively. When '3-digit', 3-digit day of year is shown. Preferably, this is inherited from user's locale by default.

5. showWeekday

When 'false', weekday is hidden. When 'true', short/full weekday name is shown, as per locale. When 'shortName' (or 'fullName'), abbreviated (or complete) weekday name is used. Preferably, this is inherited from user's locale by default.

6. showEra

When 'false', era is hidden. When 'true', era is shown. Preferably, this is inherited from user's locale.

7. displayOrder

Describes order of date components using 'Y' for year, 'M' for month, 'D' for day, 'W' for weekday and 'E' for era. Duplicate and unrecognized characters are ignored. Preferably, this is inherited from user's locale by default.

8. dateSeparator

Separator character(s) to delimit year, month and day components of short date format. Preferably, this is inherited from user's locale by default.

9. calendar

Defines calendar to be used for calculating day, month and year. Preferably, this is inherited from user's locale by default.

10. whenZero

Characters to be displayed when time value is zero. Preferably, this is " " by default.

11. pattern

Date substitution mask. DateFormatSymbols class associated with ICU date pattern defines valid tokens. Preferably, this is inherited from user's locale by default.

Examples

| Data Value | Formatted Output |
|---|---|
| Standard Format: <dateFormat stdFormat="medium"/> | |
| 19990228 | Feb. 28, 1999 |
| 20020305 | Mar. 5, 2002 |
| Japanese Imperial: <dateFormat calendar="Imperial"/> | |
| 19920228 | Heisei 4E 2M 28D |
| 20020805 | Heisei 14E 8M 5D |

N.B., preferably:

The Japanese characters for Heisei era replace "Heisei"
The Japanese characters designating era replace "E"
The Japanese characters for appropriate month replace "M"
The Japanese characters for appropriate day of month replace "D"

| New Separator: <dateFormat dateSeparator="-"/> | |
|---|---|
| Data Value | Formatted Output |
| 19990228 | 1999-02-28 |
| 20020305 | 2002-03-05 |

I18N Support

ICU Simple Date Format class implements date format specifications. Unfortunately, this class supports only patterns; properties are not supported. Therefore, I18N should implement a class to encapsulate the ICU implementation wherein the attribute values can be set/reset and pattern generation can be deferred until the format is actually used and the underlying ICU format class is created.

I18N overloads its date-time format class to format dates, times, date-times and intervals. ICU 2.0 does not provide support for Japanese Imperial calendar. I18N must provide an implementation of the ICU Calendar class in order to support "Imperial" calendar attribute.

ICU 2.0 does not provide support for whenZero attribute. I18N implementation should intercept value to be formatted and substitute value of whenZero attribute in cases where intercepted value is equal to zero (see also whenMissing attribute in Basic Format).

| Attribute | I18NDateTimeFormat:: method |
|---|---|
| dateStyle | I18NDateTimeFormatStyle |
| showYears | showYears |
| showMonths | showMonths |
| showDays | showDays |
| showWeekday | showWeekday |
| showEra | showEra |
| displayOrder | setSymbolDisplayOrder |
| dateSeparator | setDateSeparatorSymbol |
| calendar | setCalendar |
| whenZero | setWhenZero |
| pattern | setPattern |

Time Format

The time format properties are applicable to time, date-time and all interval value types.

Attributes 1. timeStyle

Three pre-defined time formats are provided as implemented by ICU: 'short', 'long', and 'full'. Preferably, this is inherited from user's locale by default.

2. showHours

When 'true', 1-digit hour is shown in 12-hour clock, and 2-digit hours in 24-hour clock. When 'false', hour is hidden. When '1-digit' or '2-digit', 1- or 2-digit hour value is shown, respectively. Preferably, this is inherited from user's locale by default.

3. showMinutes

When 'true', minutes are shown in time value. When 'false', minutes are hidden. When '1-digit' or '2-digit', 1- or 2-digit minutes are shown. Preferably, this is inherited from user's locale by default.

4. showSeconds

When 'true', seconds are shown in time value. When 'false', seconds are hidden. When '1-digit' or '2-digit', 1- or 2-digit seconds are shown. Preferably, this is inherited from user's locale by default.

5. showMilliseconds

When 'true', 3-digit milliseconds are shown. When 'false', milliseconds are hidden. When '1-digit' or '2-digit', 1- or 2-digit milliseconds are shown. Preferably, this is inherited from user's locale by default.

6. decimalDelimiter

Character delimiter between seconds and milliseconds of a time value. This delimiter is applicable only when milliseconds are presented. Preferably, this is inherited from user's locale by default.

7. timeSeparator

Separator character(s) to delimit hour, minute and seconds components of all time formats. Preferably, this is inherited from user's locale by default.

8. showAmPm

When 'true', 'am' or 'pm' will be appended to 12-hour clock values. Preferably, this is inherited from user's locale by default.

9. showTimeZone

When 'true', time zone will be appended to time value. When 'false', time zone is hidden. Preferably, this is inherited from user's locale by default.

10. clock

Controls display of time value in 12-hour or 24-hour format. Preferably, this is inherited from user's locale by default.

11. whenZero

Characters to be displayed when time value is zero. Preferably, this is " " by default.

12. pattern

Time substitution mask. DateFormatSymbols class associated with ICU time pattern defines valid tokens. In addition, three pre-defined time formats are provided as implemented by ICU: 'short', 'long', and 'full'. Preferably, this is inherited from user's locale by default.

I18N Support

Like date format, ICU Simple Date Format class implements time format specifications. This class supports only patterns; properties are not supported. Therefore, I18N should implement a class to encapsulate the ICU implementation wherein the attribute values can be set/reset and pattern generation can be deferred until the format is actually used and the underlying ICU format class is created.

ICU 2.0 does not provide support for whenZero attribute. I18N implementation should intercept value to be formatted and substitute value of whenZero attribute in cases where intercepted value is equal to zero (see also whenMissing attribute in Basic Format).

| Attribute | I18NDateTimeFormat:: method |
|---|---|
| timeStyle | I18NDateTimeFormatStyle |
| showHours | showHours |
| showMinutes | showMinutes |
| showSeconds | showSeconds |
| showMilliseconds | showMilliseconds |
| showAmPm | showClock |
| showTimeZone | showTimeZone |
| decimalDelimiter | setDecimalDelimiterSymbol |
| timeSeparator | setTimeSeparatorSymbol |
| clock | setClock |
| whenZero | setWhenZero |
| pattern | setPattern |

Date-Time Format

Date-time format is specified as a combination of date and time properties. See date format, and time format for details.

I18N Support

As ICU Simple Date Format class implements both date format and time format specifications (see above), support for date-time should be implemented as a combination of these two classes.

Days Interval Format

Query Service API (see [QSAPI]) returns two interval types: days-time and years-months. The days-time interval is expressed in days, hours, minutes, seconds and milliseconds; it is rendered with day interval format.

A day interval format may be rendered in day, hour, minute, second, or millisecond units of measure. The value is formatted according to the decimal format specifications (see above). Also, this format is implemented by the time format specifications (see above), augmented with control over day component. Using these attributes, the interval may be rendered in a combination of days, hours, minutes, seconds and milliseconds; by default, such interval values are formatted in days, including decimal places.

Attributes

All attributes of decimal format and time format specifications are valid. New or modified attributes are outlined below:

1. units

When 'days', 'hours', 'minutes', or 'seconds', interval is converted to days, hours, minutes, or seconds, and then rendered as a decimal number followed by unit of measure. When 'milliseconds', interval is converted to seconds, and then rendered as seconds and milliseconds, each followed by their appropriate unit of measure. When "time", interval is rendered as days followed by time format (e.g., "35 4:48"). Preferably, this is set to "time" by default.

2. showDays

When 'true', day is shown. When 'false', day is hidden. Preferably, this is inherited from user's locale by default.

I18N Support

As ICU Simple Date Format class implements both date format and time format specifications (see above), and ICU Decimal Format class implements the integer format specification. Preferably, support for Days Interval is implemented using these two ICU classes.

I18N does not determine when to format as a decimal or as days, hours, minutes and seconds: the API client does that. When units of measure are requested (see 'units' above), the API client must convert individual interval properties into selected unit of measure, as outlined below, and then format the value using I18NNumberFormat.

| Units | Formula |
|---|---|
| Days | days + (hours/24) + (minutes/1440) + (seconds/86400) + (mSeconds/86400000) |
| hours | (days * 24) + hours + (minutes/60) + (seconds/60000) + (mSeconds/3600000) |
| minutes | (days * 1440) + (hours * 60) + minutes + (seconds/60) + (mSeconds/60000) |
| seconds | (days * 86400) + (hours * 3600) + (minutes * 60) + seconds + (mSeconds/1000) |
| milliseconds | Calculated as seconds and rendered as seconds and milliseconds |
| Attribute | I18NDateTimeFormat:: method |
| units | not applicable - calculated by I18N client |
| showDays | showDays |

Months Interval Format

As noted above, Query Service API returns two interval types: days-time and years-months. The years-months interval is expressed in years and months; it is rendered with the month interval format.

A month interval format is implemented by a combination of the attributes of the date format specification (see above). A month interval value may be rendered in terms of years and months; by default, such interval values are formatted in months.

Attributes 1. showYears

When 'false', year is hidden. When 'true', year is shown with/without century, as per locale. When 'hideCentury', first two digits (century) are hidden. When 'showCentury', all digits are shown (i.e., century included). Preferably, this is inherited from user's locale by default.

2. showMonths

When 'false', month is hidden. When 'true', 1- or 2-digit month is shown, as per locale. When '1-digit' or '2-digit', 1- or 2-digit month is shown, respectively. When 'shortName' (or 'fullName'), abbreviated (or complete) month name is shown. Preferably, this is inherited from user's locale by default.

3. displayOrder

Describes order of date components using 'Y' for year, 'M' for month, 'D' for day, 'W' for weekday and 'E' for era. Duplicate and unrecognized characters are ignored. Preferably, this is inherited from user's locale by default.

4. dateSeparator

Separator character(s) to delimit year, month and day components of short date format. Preferably, this is inherited from user's locale by default.

5. whenZero

Characters to be displayed when time value is zero. Preferably, this is " " by default.

6. pattern

Date substitution mask. DateFormatSymbols class associated with ICU date pattern defines valid tokens. Preferably, this is inherited from user's locale by default.

I18N Support

As ICU Simple Date Format class implements both date format specifications (see above). Support for Months Interval should be implemented using this ICU class.

| Attribute | I18NDateTimeFormat:: method |
|---|---|
| showYears | showYears |
| showMonths | showMonths |
| displayOrder | setSymbolDisplayOrder |
| dateSeparator | setDateSeparatorSymbol |
| whenZero | setWhenZero |
| pattern | setPattern |

The value formatting system 30, 60 according to the present invention, and the methods described above, may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A value formatting system for determining format specifications in reports, the value formatting system comprising:
a computer:
a format collection unit that collects data value format attributes and patterns for one or more value types in a report from a first source and data value format attributes and patterns for the one or more value types from a second source, the data value format attributes and patterns being used to convert a data value from an internal format into a string of characters for display purposes, wherein each of the data value format patterns comprises a substitution mask that includes one or more meta-characters;
a format repository that stores the collected data value format attributes and patterns; and
a format merging unit that merges the collected data value format attributes and patterns into a single format specification for each of the value types, wherein, for each value type, the format merging unit merges the collected data value format attributes and patterns associated with the respective value type according to a precedence list that specifies an order of precedence between the data value format attributes and patterns collected from the first source and the data value format attributes and patterns collected from the second source, and
wherein one or more of the format collection unit and the format merging unit are executable by the computer.

2. The system as claimed in claim 1, further comprising a format analysis unit that analyzes and orders the collected data value format attributes and patterns into a hierarchy.

3. The system as claimed in claim 1, further comprising a rendering unit that renders a value associated with a data item to the report using the single format specification.

4. The system as claimed in claim 1, wherein the precedence list specifies that the data value format attributes and patterns collected from the first source take precedence over the data value format attributes and patterns collected from the second source and wherein, for each value type, the format merging unit overrides the data value format attributes collected from the second source with the data value format attributes collected from the first source based on the precedence list.

5. The device as claimed in claim 1, further comprising:
a conditional formatting resolution unit that processes conditional formatting styles set in a reporting application;
an inherited format classification unit that classifies inherited format specifications;
a defined format classification unit that classifies defined format specifications;
a defined format selection unit that selects a defined format specification from the classified defined format specifications; and
a format association unit that associates the selected defined format specification to a corresponding inherited format specification, and that applies the associated format specification to a data item value.

6. A method of formatting data item values in reports, the method comprising:
collecting data value format attributes and patterns for one or more value types in a report from a first source and data value format attributes and patterns for the one or more value types from a second source, the data value format attributes and patterns being used to convert a data value from an internal format into a string of characters for display purposes, wherein each of the data value format patterns comprises a substitution mask that includes one or more meta-characters;
storing the collected data value format attributes and patterns in a repository; and
merging, by a computer, the collected data value format attributes and patterns into a single format specification for each of the value types, wherein merging the collected data value format attributes and patterns comprises merging, for each value type, the collected data value format attributes and patterns associated with the respective value type according to a precedence list that specifies an order of precedence between the data value format attributes and patterns collected from the first source and the data value format attributes and patterns collected from the second source.

7. The method as claimed in claim 6, further comprising analysing and ordering the collected data value format attributes and patterns into a hierarchy.

8. The method as claimed in claim 6, further comprising rendering a value associated with a data item to the report using the format specification.

9. The method as claimed in claim 6, further comprising:
processing conditional formatting styles set in a reporting application;
classifying inherited format specifications in the reporting application, wherein classifying the inherited format specifications includes gathering and merging the inherited format specifications;
classifying defined format specifications in the reporting application;
selecting a defined format specification from the classified defined format specifications;
associating the selected defined format specification to a corresponding inherited format specification; and
applying the associated selected defined format specification to a data item value.

10. A non-transitory computer-readable storage medium having computer-readable code embodied therein for use in the execution in a computer to:

collect data value format attributes and patterns for one or more value types in a report from a first source and data value format attributes and patterns for the one or more value types from a second source, the data value format attributes and patterns being used to convert a data value from an internal format into a string of characters for display purposes, wherein each of the data value format patterns comprises a substitution mask that includes one or more meta-characters;

store the collected data value format attributes and patterns in a repository; and merge the collected data value format attributes and patterns into a single format specification for each of the value types, wherein the code for use in the execution in the computer to merge the collected data value format attributes and patterns comprises code for use in the execution in the computer to merge, for each value type, the collected data value format attributes and patterns associated with the respective value type according to a precedence list that specifies an order of precedence between the data value format attributes and patterns collected from the first source and the data value format attributes and patterns collected from the second source.

11. A value formatting system for determining format specifications in reports, the value formatting system comprising:

a computer;

a format collection unit that collects a first format specification from a first source for a data item in a report and a second format specification from a second source for the data item in the report, each of the first format specification and the second format specification including respective data value format attributes and patterns for the data item in the report, the data value format attributes being used to convert a data value from an internal format into a string of characters for display purposes;

a format repository that stores the collected data value format attributes and patterns; and a format merging unit that merges the first format specification and the second format specification into a single format specification for the data item, wherein the format merging unit merges the first format specification and the second format specification at least in part by overriding values for data value format attributes included in the first format specification with any values for the same data value format attributes included in the second format specification, wherein one or more of the format collection unit and the format merging unit are executable by the computer.

12. A value formatting system for determining format specifications in reports, the value formatting system comprising:

a computer;

a format collection unit that collects data value format attributes and patterns for a data item in a report, wherein the data value format attributes are used to convert a data value from an internal format into a string of characters for display purposes, wherein the format collection unit collects a first format specification that includes data value format attributes and patterns from a first source and a second format specification that includes data value format attributes and patterns from a second source, wherein each of the data value format patterns comprises a substitution mask that includes one or more meta-characters, and wherein the data value format attributes and patterns from the first source are stored in a report specification;

a format repository that stores the collected data value format attributes and patterns;

a format analysis unit that analyzes and orders the collected data value format attributes and patterns into a hierarchy; and a format merging unit that merges the collected data value format attributes and patterns into a single format specification for the data item, wherein the format merging unit merges the collected data value format attributes and patterns into a single format specification at least in part by replacing data value format attributes included in the first format specification with data value format attributes included in the second format specification to generate the single format specification, wherein one or more of the format collection unit, the format analysis unit and the format merging unit are executable by the computer.

* * * * *